United States Patent [19]

Khelifa et al.

[11] Patent Number: 5,474,594
[45] Date of Patent: Dec. 12, 1995

[54] METHOD AND APPARATUS FOR THE DESORPTION OF A MATERIAL WHICH ADSORBS MOISTURE

[75] Inventors: Noureddine Khelifa, Stuttgart; Karl Lochmahr, Vaihingen, both of Germany

[73] Assignee: Behr GmbH & Co., Stuttgart, Germany

[21] Appl. No.: 268,311

[22] Filed: Jun. 30, 1994

[30] Foreign Application Priority Data

Jul. 1, 1993 [DE] Germany .......................... 43 21 863.6

[51] Int. Cl.⁶ .................................................. B01D 53/04
[52] U.S. Cl. .................................... 95/14; 95/18; 95/115; 95/120; 95/126; 96/112; 96/128; 96/143; 96/146
[58] Field of Search ................................. 95/14, 17, 18, 95/22, 23, 114, 115, 120, 126; 96/112, 126–128, 143, 146; 55/267, 268

[56] References Cited

U.S. PATENT DOCUMENTS

| | | | |
|---|---|---|---|
| 3,359,706 | 12/1967 | Zankey | 95/115 X |
| 4,023,940 | 5/1977 | Shultz | 96/126 X |
| 4,197,095 | 4/1980 | White, Jr. et al. | 95/23 X |
| 4,315,759 | 2/1982 | Benkmann | 95/23 |
| 4,351,649 | 9/1982 | Owens et al. | 96/126 X |
| 4,718,020 | 1/1988 | Duich et al. | 95/126 X |
| 4,806,132 | 2/1989 | Campbell | 95/23 X |
| 4,941,894 | 7/1990 | Black | 95/14 |
| 5,037,458 | 8/1991 | Trepaud | 96/112 X |
| 5,199,964 | 4/1993 | Gräff | 95/14 |
| 5,271,557 | 12/1993 | Lynch et al. | 95/17 X |

FOREIGN PATENT DOCUMENTS

| | | | |
|---|---|---|---|
| 3106469 | 9/1982 | Germany . | |
| 4133917 | 4/1993 | Germany . | |
| 55-051703 | 4/1980 | Japan | 96/112 |
| 0854424 | 8/1981 | Switzerland | 95/17 |
| 1364357 | 1/1988 | Switzerland | 95/17 |
| 0929178 | 5/1982 | U.S.S.R. | 95/14 |
| 1579542 | 4/1987 | U.S.S.R. . | |

OTHER PUBLICATIONS

Dahm et al., "Anlagen zur Intensiven Trocknung von Gasen", pp. 43–47, (1960).
Patents Abstract of Japan, 58–79520, "Regenerating Device For Desulfurizer", vol. 7, No. 17, (1983).

*Primary Examiner*—Robert Spitzer
*Attorney, Agent, or Firm*—Foley & Lardner

[57] ABSTRACT

The invention relates to a method for the desorption of a sorbent by an air stream which is delivered by a blower and, prior to entering the sorbent, is heated. In order to reduce the desorption time, provision is made for adjusting the mass of the air stream as a function of the outlet temperature of the air stream exiting from the sorbent, in such a way that, when a preset temperature limit value is reached, the mass of the air stream is reduced, and the desorption is continued with an air stream heated to a higher temperature. The method is particularly suitable for the desorption of adsorbent in sorption reactors contained in refrigerant-free air conditioning plants.

16 Claims, 2 Drawing Sheets

METHOD AND APPARATUS FOR THE DESORPTION OF A MATERIAL WHICH ADSORBS MOISTURE

BACKGROUND OF THE INVENTION

The present invention relates to a method for the desorption of a material which adsorbs moisture, and to a device for implementing the method.

DE-A 41 33 917 discloses a device for air conditioning a passenger cabin of a motor vehicle, which device comprises two reactors with a sorbent disposed therein. The reactors serve for drying a circulating air stream, with only one of the reactors connected in parallel being operational at any one time. The other reactor is subject to desorption at the same time, to which end it is supplied with a heated air stream which flows through the sorbent and drives off the moisture adsorbed therein. For the purpose of heating the air stream, a heat exchanger is provided wherein exhaust gas heat, refrigerant heat or the like can be supplied to the air stream.

The desorption in a reactor is effected in such a way that the air stream heated to a sufficiently high temperature flows through the reactor that is subject to desorption during a fixed period. The period is selected based on empirical values and is a function of the air flow rate of the heated air stream and of the heating energy available. Since heating energy is available only to a limited extent, it is necessary, in order to achieve an adequate inlet temperature of the heated air stream, for the air flow rate thereof to be adjusted accordingly.

The desorption time for a reactor significantly determines the design of the reactors connected in parallel, which are operated alternately. It is necessary to ensure that, over the entire desorption time for the one reactor, the other reactor guarantees the drying required of the air stream supplied, even under unfavorable conditions. To this end, a certain amount of sorbent is required.

SUMMARY OF THE INVENTION

It is therefore an object of the present invention to provide an improved method for the desorption of a sorbent.

It is an object of the invention to provide, according to its most preferred embodiments, a method for the desorption of a sorbent wherein maximum desorption possible can be achieved with a short desorption time.

A further object of the invention is to provide a device for implementing the method according to the invention.

In accomplishing these and other objects, there has been provided according to one aspect of the present invention a method for the desorption of a sorbent material which adsorbs moisture, comprising the steps of heating an air stream to a first inlet temperature, prior to entering the sorbent material, in a heating device; passing the heated air stream through the sorbent material at a first mass flow rate to desorb moisture therefrom; measuring the exit temperature of the air stream as it exits from the sorbent material; in response to the exit temperature reaching a predetermined temperature limit value, adjusting the mass flow of the airstream to a second mass flow rate, lower than the first mass flow rate, as a function of the outlet temperature of the air stream exiting from the sorbent material, whereby the inlet temperature increases to a second inlet temperature higher than the first inlet temperature; and continuing desorption with the air stream at the second mass flow rate and the second inlet temperature.

According to another aspect of the present invention, there has been provided a device for implementing the method of the invention, comprising: a blower having an air exit conduit; a heating device connected downstream of the air exit conduit to receive and heat air exiting from the blower; a container for containing sorbent material, connected downstream of the heating device for receiving heated air from the heating device; a temperature sensor disposed in the outlet air stream exiting from the container; and a control unit connected to control the speed of the blower in response to temperature information received from the temperature sensor.

Further objects, features and advantages of the invention will become clear from the detailed description of preferred embodiments which follows, when considered together with the attached figures of drawing, in which illustrative embodiments of the invention are shown.

DETAILED DESCRIPTION OF THE PREFERRED EMBODIMENTS

Figure 1:
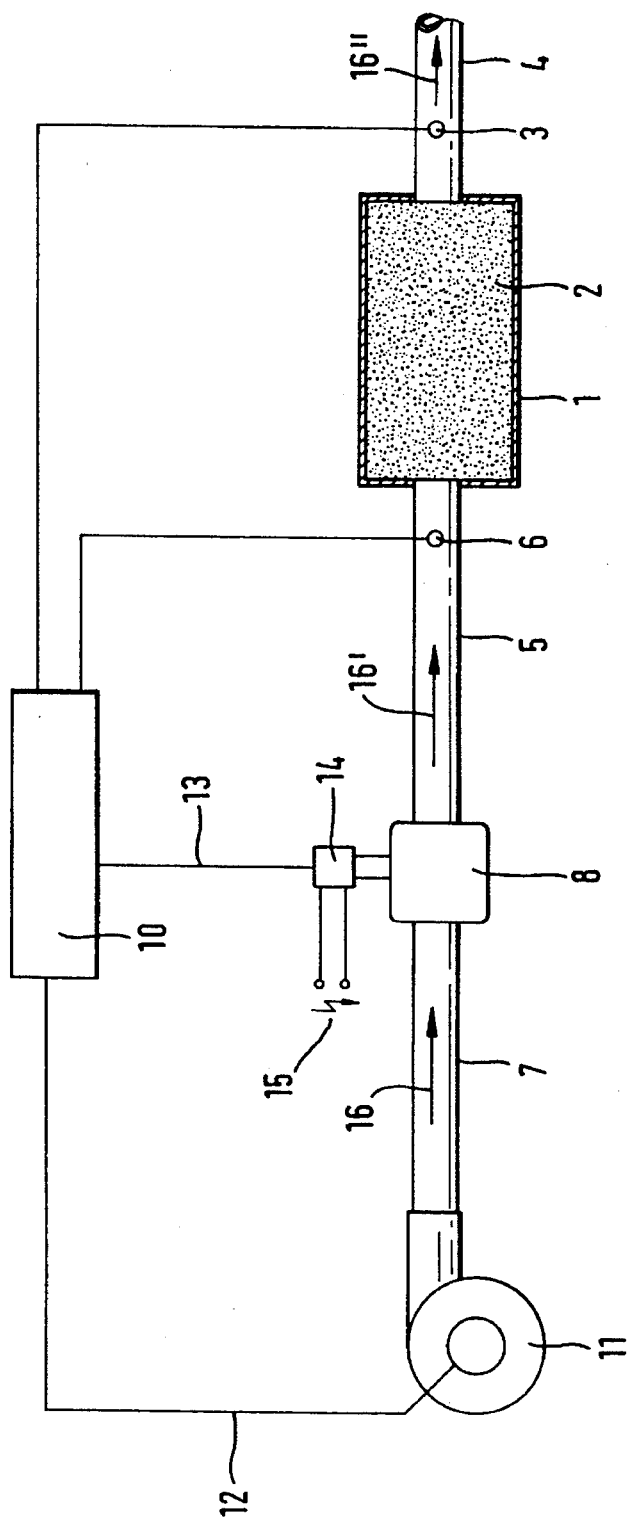
FIG. 1 is a diagrammatic depiction of a device for the desorption of a material which adsorbs moisture.

According to the invention, for the purpose of desorption of sorbent in a reactor, an air stream of high mass is first passed through the reactor which, owing to the limited heat output can be heated only to a commensurately low temperature. The high air stream ensures rapid discharge of the moisture. As the uptake of water decreases, less heat is removed from the air stream, so that the outlet temperature of the air stream escaping from the sorbent rises. When a preset temperature limit value is reached, which may be a preset temperature difference between the inlet temperature and the outlet temperature, the mass flow of the air stream is reduced, preferably by lowering the flow velocity, so that the air stream is heated, in the heating device, to a higher final temperature. The inlet temperature of the air stream entering the sorbent shows a distinct rise, resulting in the desorption now being continued with the lower-mass air stream heated to a higher temperature. The elevated temperature drives from the sorbent a further fraction of the remaining moisture, which is removed with the lower-mass air stream. It was found that, by virtue of the air stream mass control according to the invention, a low desorption time can be achieved together with reduced energy demand. The residual loading of the sorbent is likewise distinctly smaller than after a desorption with an air stream of constant mass and constant temperature. The lower residual loading enables adsorption over a longer operating time, and as a result, for the same size, a greater capacity is available.

The reduced desorption time achieved by the desorption according to the invention, and the increased adsorption time resulting from the lower residual loading, make it possible to choose a smaller size of alternately operated reactors for the same air conditioning capacity. The lower unit volume and the lower weight thus open up the possibility of application even in relatively small vehicles having internal-combustion engines or electric motors.

In a preferred aspect of the method it is provided that, as the outlet temperature of the lower-mass air stream approaches its inlet temperature, the heating device itself is switched off.

It is sometimes advantageous to derive the temperature limit value, which is preset as the threshold value for lowering the air stream mass, from the difference between the inlet temperature and the outlet temperature. This makes it possible to match the heat output available.

The device for implementing the method has a control unit which, on the one hand, is linked to the blower and, on the other hand, to a temperature sensor disposed in the outlet air stream. As a function of the output signal of the temperature sensor, the blower speed is reduced, preferably in one stage, and thus the flow velocity is decreased, as a result of which the mass flow of the air stream is reduced.

In order to reliably prevent overheating of the reactor, provision is made for the control unit to be linked to a further temperature sensor disposed in the inlet air stream. As soon as a permissible maximum temperature limit value is exceeded, the control unit switches off the heating device. The control unit is expediently designed so that it can be switched off electrically. Correspondingly, the control unit monitors the blower in order to switch off the heating device if the blower fails.

Preferably, the control unit is a microprocessor which at the same time is able to carry out any necessary calculations and, moreover, can be programmed according to the requirements for each particular application.

The heater provided is preferably a PTC heater, i.e., a resistance heater having a positive temperature coefficient. A heater of this design ensures a low current requirement after the operating temperature is reached.

In FIG. 1, reference numeral 1 designates a reactor in which a sorbent 2 is arranged as a loose bed or a monolithic body. The sorbent used is preferably zeolite (aluminum silicate), silica gel or a similar material likewise being suitable.

Connected to opposite end faces of the reactor 1 there is an air outlet duct 4 and an air inlet duct 5, respectively. In the air outlet duct 4, downstream of the reactor 1, a temperature sensor 3 is disposed which is linked to an electronic control unit 10. In the air inlet duct 5, a further temperature sensor 6 is disposed which is likewise linked to the control unit 10.

The air supply duct 5 is connected to a heating device 8 which is supplied, via an air supply duct 7 from a blower 11, with an air stream whose flow rate can be preset. The preferably electric drive motor of the blower 11 can be switched, via a control line 12, by the control unit 10, with its speed, in particular, being controllable. Via a further control line 13, the control unit 10 actuates a switching unit 14 via which the heating device 8, which is preferably designed as an electrical resistance heater, can be connected to an electrical supply voltage 15.

In order to desorb moisture from the sorbent 2 in the reactor 1, the blower 11 is first operated at high speed, so that an air stream 16 flows at a high rate through the air supply duct 7 into the heating device 8. The air is heated to a temperature in the heating device 8 and, with a high flow velocity, flows as a heated air stream 16' through the air inlet duct 5 into the reactor 1. There it drives off the liquid adsorbed in the sorbent and discharges it in the exhaust air stream 16" through the outlet duct 4. The outlet temperature of the air stream 16" flowing out is detected by the sensor 3 and communicated to the control unit 10. If the outlet temperature reaches a preset temperature limit value, which may be preset as a fixed value in the control unit, the speed of the blower 11 is reduced via the control line 12 preferably in one stage, which results in the air flow rate of the air stream 16 being reduced. The air stream, whose flow rate is now reduced, has a lower flow velocity, and thus it is heated to a higher temperature in the heating device 8. The air stream 16' heated to a now elevated temperature enters the reactor 1 in order to drive off the moisture still bound in the sorbent and discharge it with the exhaust air stream 16". If, after the amount of air entering the reactor 1 per unit time has been reduced, an outlet temperature is observed with sensor 3 which corresponds to a next temperature limit value, preferably the heating device 8 is first switched off in order to initiate cooling of the sorbent 2 contained in the reactor 1, by means of the air stream 16 which now is no longer heated. To this end, the blower may advantageously again be switched back to its highest speed (highest capacity).

Figure 3:
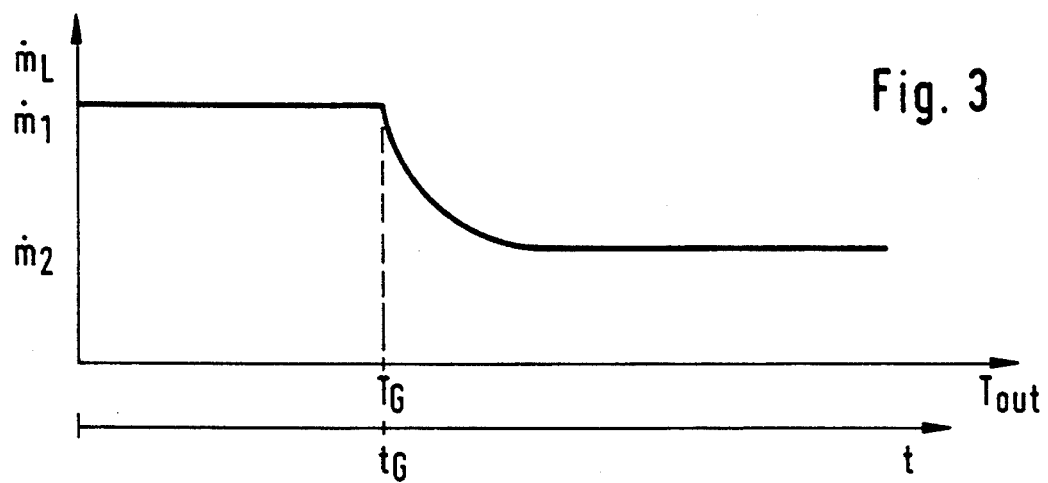
FIG. 3 is a diagram of the air flow rate as a function of outlet temperature and time.

The reduction in the amount of air $m_L$ entering the reactor 1 per unit time can be deduced from FIG. 3. When the temperature limit value $T_G$ is reached at time G, the mass flow $m_1$ drops to mass flow $m_2$, which results in a further temperature increase.

Figure 4:
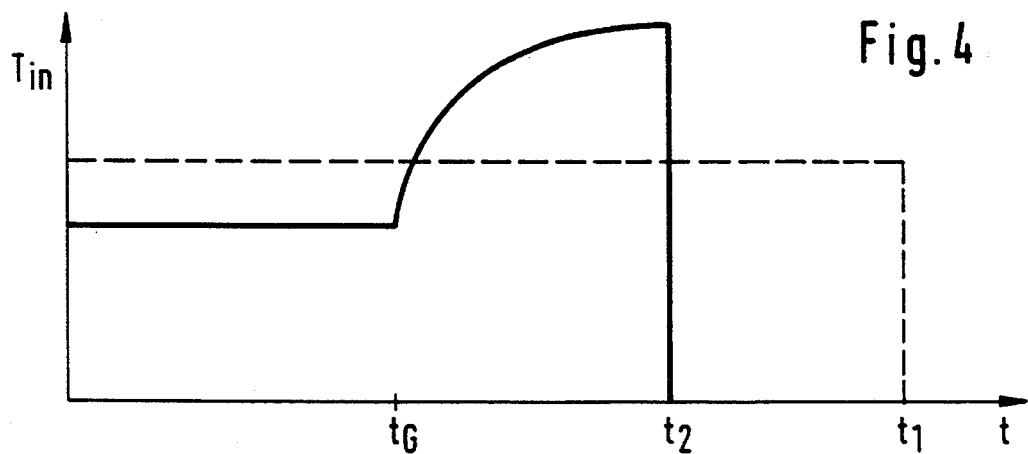
FIG. 4 is a diagram of the inlet temperature as a function of time.

FIG. 4 shows the inlet temperature $T_{in}$ which, commensurately, rises after time $t_G$ has been reached, owing to the reduction in the air flow rate. At time $t_2$, the completion of the desorption has been reached at an elevated temperature level.

FIG. 4, shows for comparative purposes, the desorption with a constant air stream and constant temperature as a dashed line. This results in a desorption time $t_1$ which is distinctly longer than the desorption time $t_2$ which can be achieved with the method according to the invention.

Figure 5:
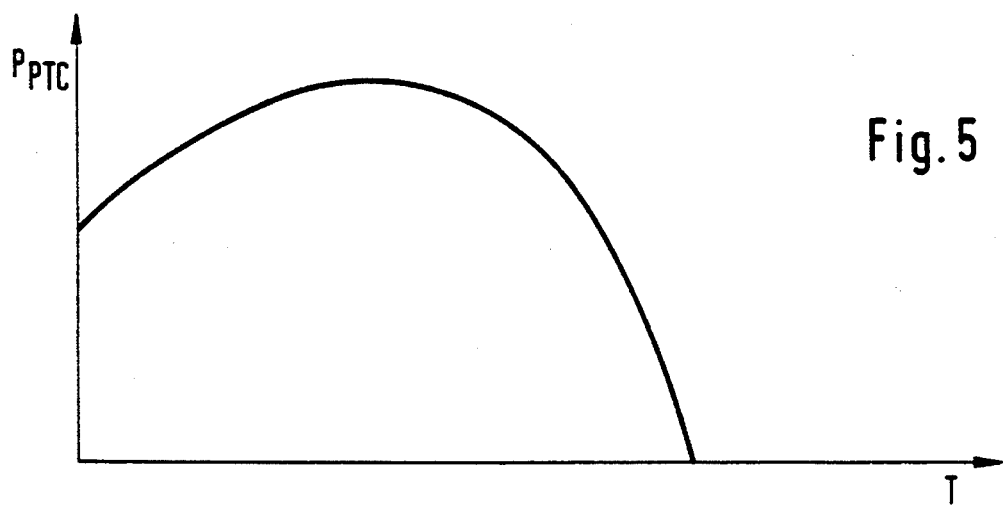
FIG. 5 is a diagram of the electrical heat output of a PTC heater as a function of temperature.

In order to minimize the heat output required for heating the air stream, provision is made in one preferred embodiment for the heating device 8 to be designed as a resistance heater, in particular a PTC heater. This self-regulating heater has the advantage that, as the temperature increases, the electric power absorbed decreases, as shown in FIG. 5.

By means of the temperature sensor 6 disposed in the air inlet duct 5, the inlet temperature of the heated air stream 16' into the reactor 1 is detected. On the one hand, it is thus possible to switch off, as a safety measure, the heater 8 when a critical maximum temperature value is reached, in order to prevent overheating of the system components; on the other hand, it is possible, owing to the arrangement of the temperature sensor 6, to effect control of the air flow rate as a function of the temperature difference between inlet temperature and outlet temperature. The temperature limit value for switching over from a higher air flow rate to a lower air flow rate is then advantageously derived from the temperature difference which is calculated by the control unit 10. When a preset, minimum difference value is reached, the control unit 10 will switch the blower 11 to a lower speed, as a result of which the inlet temperature rises, and the difference value thus becomes larger again. When a preset minimum difference value is next reached, it is either possible to carry out a further speed reduction of the blower, or else to initiate switching-off of the heating device 8, since desorption is complete. By increasing the inlet temperature in one or more stages it is possible to distinctly reduce the desorption time required and to lower to a minimum the residual loading of the sorbent. The lost heat arising is thus small.

Figure 2:
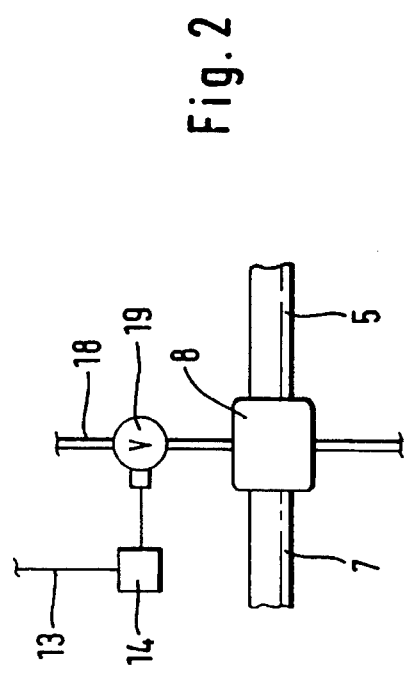
FIG. 2 shows a detail of the depiction according to FIG. 1, with a heat exchanger as the heating device.

The diagrammatic depiction according to FIG. 1 provides for an electric heating device. As shown in FIG. 2, the heating device 8 may expediently also be a heat exchanger which, in particular, has liquid flowing through it. Incorporated in the intake 18 there is a control valve 19 which controls the through-flow and which can be actuated via the switching unit 14 and the control line 13 of the control unit 10. The heat exchanger may be fed, e.g., by the cooling circuit of a motor (electric motor, internal-combustion engine).

What is claimed is:

1. A method for the desorption of a sorbent material which adsorbs moisture, comprising the steps of:

heating an air stream to a first inlet temperature, prior to entering the sorbent material, in a heating device;

passing the heated air stream through the sorbent material at a first mass flow rate to desorb moisture therefrom;

measuring the exit temperature of the air stream as it exits from the sorbent material;

in response to said exit temperature reaching a predetermined temperature limit value, adjusting the first mass flow rate of the air stream to a second mass flow rate, lower than said first mass flow rate, as a function of the exit temperature of the air stream exiting from the sorbent material, whereby said first inlet temperature increases to a second inlet temperature higher than said first inlet temperature; and continuing desorption with the air stream at said second mass flow rate and said second inlet temperature.

2. A method as claimed in claim 1, wherein the step of adjusting the first mass flow rate of the air stream comprises controlling its flow velocity.

3. A method as claimed in claim 1, further comprising the step of switching off said heating device when the temperature of the air stream of said second mass flow rate, as it exits said sorbent material, approaches the second inlet temperature of said air stream.

4. A method as claimed in claim 1, further comprising the steps of measuring the first inlet temperature of the air stream entering the sorbent material, and deriving the predetermined temperature limit value from the difference between the first inlet temperature of the air stream entering said sorbent material and the exit temperature of the air stream exiting said sorbent material.

5. A method as claimed in claim 1, further comprising the steps of monitoring the first and second temperatures of said air stream entering said sorbent material, and, when a predetermined maximum temperature limit value is exceeded, switching off said heating device.

6. A method as claimed in claim 1, wherein the sorbent material comprises zeolite or silica gel.

7. A method as claimed in claim 1, wherein the sorbent material is arranged as a loose bed or a monolithic body.

8. A method as claimed in claim 1, wherein said first inlet temperature increases to said second inlet temperature higher than said first inlet temperature by passing the air stream through said heating device.

9. A device for implementing a method for the desorption of a sorbent material which absorbs moisture, comprising:

a blower having an air exit conduit;

a heating device connected downstream of said air exit conduit to receive and heat air exiting from said blower;

a container for containing sorbent material, connected downstream of said heating device for receiving heated air from said heating device;

a temperature sensor disposed in the outlet air stream exiting from said container; and a control unit connected to control the speed of said blower in response to temperature information received from said temperature sensor.

10. A device as claimed in claim 9, further comprising a second temperature sensor disposed in an air passage through which the inlet air stream entering said container from said heating device is guided, and wherein said control unit is connected to receive information from said second temperature sensor.

11. A device as claimed in claim 10, wherein the heating device is connected to said control device and is adapted to be switched off by the control device in response to a temperature sensed by said second temperature sensor.

12. A device as claimed in claim 9, wherein the heating device comprises a resistance heater.

13. A device as claimed in claim 12, wherein the resistance heater comprises a PTC heater.

14. A device as claimed in claim 9, wherein the heating device comprises a heat exchanger.

15. A device as claimed in claim 14, wherein said heat exchanger includes a liquid control valve which is disposed in the intake of said heat exchanger and is adapted to be adjusted by said control unit.

16. A device as claimed in claim 9, wherein the control unit comprises a microprocessor.

* * * * *